No. 607,441. Patented July 19, 1898.
H. KOHL.
SEPARATOR FOR STEAM AND WATER.
(Application filed June 3, 1897.)
(No Model.)

Witnesses:
William Schulz
William Miller

Inventor:
Hugo Kohl
by his attorneys
Roeder & Briesen

UNITED STATES PATENT OFFICE.

HUGO KOHL, OF DUSSELDORF, GERMANY.

SEPARATOR FOR STEAM AND WATER.

SPECIFICATION forming part of Letters Patent No. 607,441, dated July 19, 1898.

Application filed June 3, 1897. Serial No. 639,271. (No model.)

*To all whom it may concern:*

Be it known that I, HUGO KOHL, a subject of the German Emperor, residing at Dusseldorf, Germany, have invented certain new and useful Improvements in Separators for Steam and Water, with description as follows.

This invention relates to a steam and water separator of novel construction and composed of a receptacle containing a series of perforated troughs to perform the separation and a pair of counterbalancing oscillating vessels for collecting the water.

Figure 1:
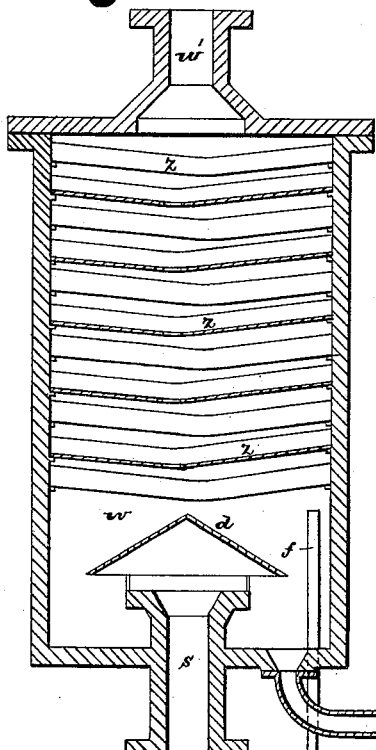
Figure 2:
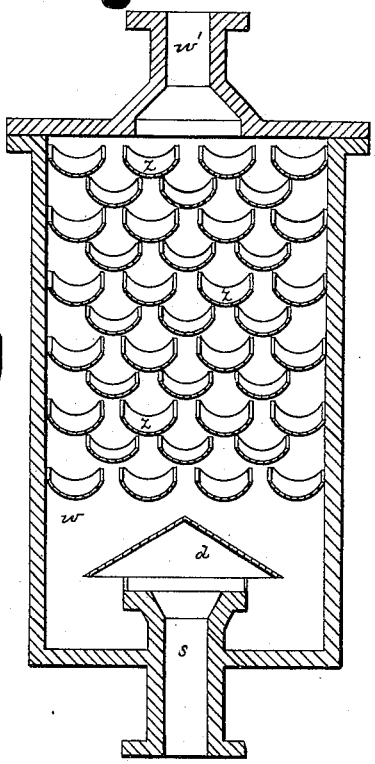
Figure 3:
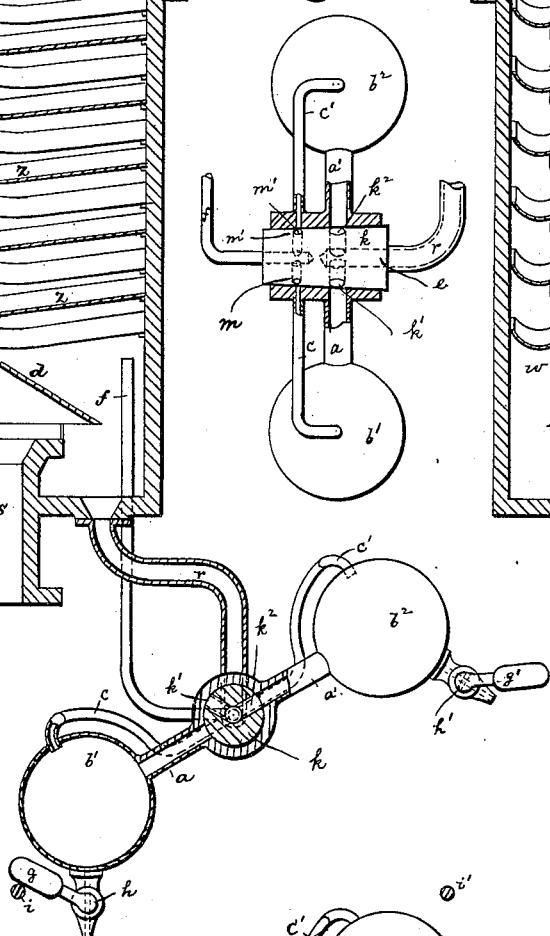
Figure 4:
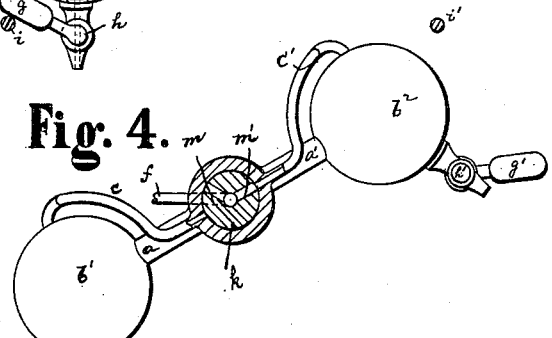

In the accompanying drawings, Figure 1 is a vertical central section of my improved steam and water separator. Fig. 2 is a cross-section through the receptacle $w$; Fig. 3, a horizontal section through the water-collecting device; and Fig. 4, a longitudinal section of the same, taken on a different plane from Fig. 1.

The letter $w$ represents a receptacle containing the perforated troughs $z$, that are curved or bent toward the center or toward one end and are arranged in horizontal rows, so that the troughs of one row are staggered with those of the adjoining rows. The steam admitted by an upper inlet $w'$ will on passing along one row of troughs strike the troughs of the row next below, so as to give off its water, which will flow through the perforations of the troughs. These perforations are also staggered, so that but a very small percentage of steam can descend through them in a straight direction.

The steam escapes at the bottom of receptacle $w$ through pipe $s$, which is surmounted by a sloping roof $d$, which excludes the descending water from the pipe. This water flows off through a tube $r$, controlled by a cock $k$, the oscillating casing of which is connected to a pair of counterbalancing vessels $b'$ $b^2$, which alternately receive and discharge the water, so that they will alternately rise and fall.

The valve-plug $k$ is fixed to the pipe $r$ and is provided with a pair of ports $k'$ $k^2$, entering the central bore $e$ of the plug that communicates with such pipe. The ports are alternately brought into alinement with pipes $a$ $a'$, that extend from the oscillating valve-casing to the vessels $b'$ $b^2$. These vessels are provided with discharge-nozzles $h$ $h'$, having cocks with weighted handles $g$ $g'$, that are adapted to contact with stops $i$ $i'$. Additional pipes $c$ $c'$, leading from the vessels $b'$ $b^2$, are adapted to be brought into alternate communication with ports $m$ $m'$ of plug $k$ and thence with a steam-return pipe $f$, projecting from such plug into receptacle $w$ to a point above the water-level. These pipes are designed to return the steam accumulating in the vessels $b'$ $b^2$ to the receptacle $w$, so that such steam will not impede the inflow of the water. If a sufficient quantity of water has accumulated to fill vessel $b'$, such vessel will descend, Fig. 1, while the vessel $b^2$ will rise. On descending the weight $g$ will strike stop $i$ to open the cock, so that the water in vessel $b'$ is discharged. The partial rotation of the vessels and valve-casing will disconnect the port $k'$ from pipe $a$ and connect port $k^2$ with pipe $a'$, so that the water will now enter vessel $b^2$. While the receptacle $w$ is thus put into communication with either the vessel $b'$ or $b^2$ the pipe $f$ is likewise put into communication therewith, so that the steam can escape from the vessel during the inflow of the water. Upon the descent of the vessel $b'$ or $b^2$ its steam-outlet is closed by being brought out of alinement with the corresponding valve-port.

What I claim is—

1. A steam and water separator composed of bent perforated troughs arranged in staggered horizontal rows, and an inclosing receptacle having a steam inlet and outlet and a water-outlet, substantially as specified.

2. A steam and water separator composed of a receptacle, bent perforated troughs arranged in staggered horizontal rows contained therein, a pair of counterbalancing vessels having discharge-cocks and adapted to be brought into alternate communication with such receptacle, and means for opening the cock of the disconnected vessel, substantially as specified.

3. A steam and water separator composed of a receptacle, troughs contained therein, an outlet-pipe, a valve-plug controlling the same and having steam and water ports, a pair of counterbalancing vessels having discharge-cocks, water and steam pipes adapted to establish communication between the valve-plug ports and the vessels, and means for opening the discharge-cock of the disconnected vessel, substantially as specified.

In testimony whereof I have signed this specification in the presence of two subscribing witnesses.

HUGO KOHL.

Witnesses:
 WALTHER FRIEDRICH,
 WILLIAM ESSENWEIN.